United States Patent [19]

Staffel et al.

[11] Patent Number: 5,139,758

[45] Date of Patent: Aug. 18, 1992

[54] PROCESS FOR THE PREPARATION OF AMMONIUM POLYPHOSPHATE

[75] Inventors: Thomas Staffel; Renate Adrian, both of Hürth, Fed. Rep. of Germany

[73] Assignee: Hoechst Aktiengesellschaft, Frankfurt am Main, Fed. Rep. of Germany

[21] Appl. No.: 731,541

[22] Filed: Jul. 17, 1991

[30] Foreign Application Priority Data

Jul. 31, 1990 [DE] Fed. Rep. of Germany ....... 4024240

[51] Int. Cl.$^5$ ............................................... C01B 25/40
[52] U.S. Cl. .................................... 423/305; 423/315
[58] Field of Search ................................ 423/305, 315

[56] References Cited

U.S. PATENT DOCUMENTS 3,978,195  8/1976  Schr051380277 dter et al. ... 423/305

*Primary Examiner*—Wayne Langel
*Attorney, Agent, or Firm*—Connolly and Hutz

[57] ABSTRACT

To prepare essentially water-insoluble, chain-form ammonium polyphosphate from equimolar amounts of diammonium phosphate and phosphorus pentoxide in the presence of ammonia at temperatures of from 170° to 350° C. with constant mixing, kneading and comminution, at least some of the diammonium phosphate and phosphorus pentoxide is replaced by partially ammoniated polyphosphoric acid.

A plant for carrying out this process can comprise a sealed reactor (1) which is provided with metering devices (2, 3) and feed tubes (4, 5) for phosphorus pentoxide and diammonium orthophosphate, an ammonia feed tube (8), an ammonium polyphosphate discharge tube (9) and a line for offgas. Rotatable mixing, kneading and comminution elements are provided inside the reactor (1). Furthermore, a heatable stirred tank (11) which can be charged with polyphosphoric acid via a feed line (13) is provided and can be used to remove water vapor and ammonia from the offgas flowing from the reactor (1) via the line (20) and from which partially ammoniated polyphosphoric acid can be introduced into the reactor (1) via an outlet line (17).

7 Claims, 4 Drawing Sheets

PROCESS FOR THE PREPARATION OF AMMONIUM POLYPHOSPHATE

The present invention relates to a process for the preparation of essentially water-insoluble, chain-form ammonium polyphosphate from equimolar amounts of ammonium orthophosphate and phosphorus pentoxide in the presence of ammonia at a temperature of from 170° to 350° C. with constant mixing, kneading and comminution, and to a plant for carrying out the process.

In the preparation of ammonium polyphosphate by reacting phosphorus pentoxide and diammonium phosphate with ammonia gas, for example by the process of U.S. Pat. No. 3,978,195, it is necessary to maintain the ammonia atmosphere not only in the reaction phase, but also during the conditioning phase in the reactor, since otherwise thermal decomposition of the ammonium polyphosphate sets in. During the conditioning phase, the continuing condensation of the phosphate groups liberates water vapor in the reactor, which must be removed in order to produce an ammonium polyphosphate of high quality. It is therefore important to pass a relatively large amount of ammonia through the reactor as a transport gas for the water vapor even during the conditioning phase, although the ammonia consumption in this phase is lower than in the reaction phase. Environmental protection considerations preclude the water vapor- and ammonia-containing offgas being blown out of the reactor into the atmosphere. If it is desired to re-use the ammonia present in the offgas, the offgas must be neutralized using a mineral acid. If the mineral acid used is polyphosphoric acid, the passing of the water vapor- and ammonia-containing offgases through this acid leaves a partially ammoniated polyphosphoric acid.

It is an object of the present invention to indicate a possible use for partially ammoniated polyphosphoric acid. This is possible according to the invention in the process for the preparation of essentially water-insoluble ammonium polyphosphate from diammonium phosphate and phosphorus pentoxide in the presence of ammonia by replacing at least some of the diammonium phosphate and phosphorus pentoxide by partially ammoniated polyphosphoric acid.

The process of the invention may furthermore optionally have the following features:

a) up to 15% by weight of the diammonium phosphate and of the phosphorus pentoxide are replaced by partially ammoniated polyphosphoric acid;
b) the partially ammoniated polyphosphoric acid is obtained by bringing polyphosphoric acid into contact with water vapor- and ammonia-containing gases;
c) the water vapor- and ammonia-containing gases are offgases from the preparation of essentially water-insoluble ammonium polyphosphate by reacting diammonium phosphate and phosphorus pentoxide in the presence of ammonia;
d) the polyphosphoric acid is brought into contact with the water vapor- and ammonia-containing gases at a temperature between 120° and 170° C.;
e) the water vapor- and ammonia-containing gases are brought into contact with concentrated polyphosphoric acid;
f) the polyphosphoric acid has a $P_2O_5$ content of from 70 to 88% by weight, preferably from 76 to 84% by weight.

A plant for carrying out the process according to the invention, which comprises a sealed reactor which is provided with metering devices and feed tubes for phosphorus pentoxide and diammonium phosphate, an ammonia feed tube, an ammonium polyphosphate discharge tube and a line for offgas and inside which rotatable mixing, kneading and comminution elements are provided may be provided with a heatable stirred tank which can be charged with polyphosphoric acid via a feed line and using which water vapor and ammonia can be removed from the offgas flowing from the reactor via the line and from which partially ammoniated polyphosphoric acid can be introduced into the reactor via an outlet line.

The plant for carrying out the process according to the invention may also have the following further features:

g) a column is mounted on the stirred tank and can be charged at the top with partially ammoniated polyphosphoric acid via a line, a pump and a line, while the foot of the column is connected flow-wise to the line;
h) the line terminates in an immersion tube arranged in the stirred tank, while the stirred tank is provided with a connector which can be charged with partially ammoniated polyphosphoric acid via a line, a pump and a line.

The ammonium polyphosphate prepared by the process according to the invention has the same properties as ammonium polyphosphates obtained exclusively from phosphorus pentoxide and diammonium phosphate.

The attached drawing shows diagrammatic and partial sectional views of plants for carrying out the process according to the invention, in which.

Figure 1:
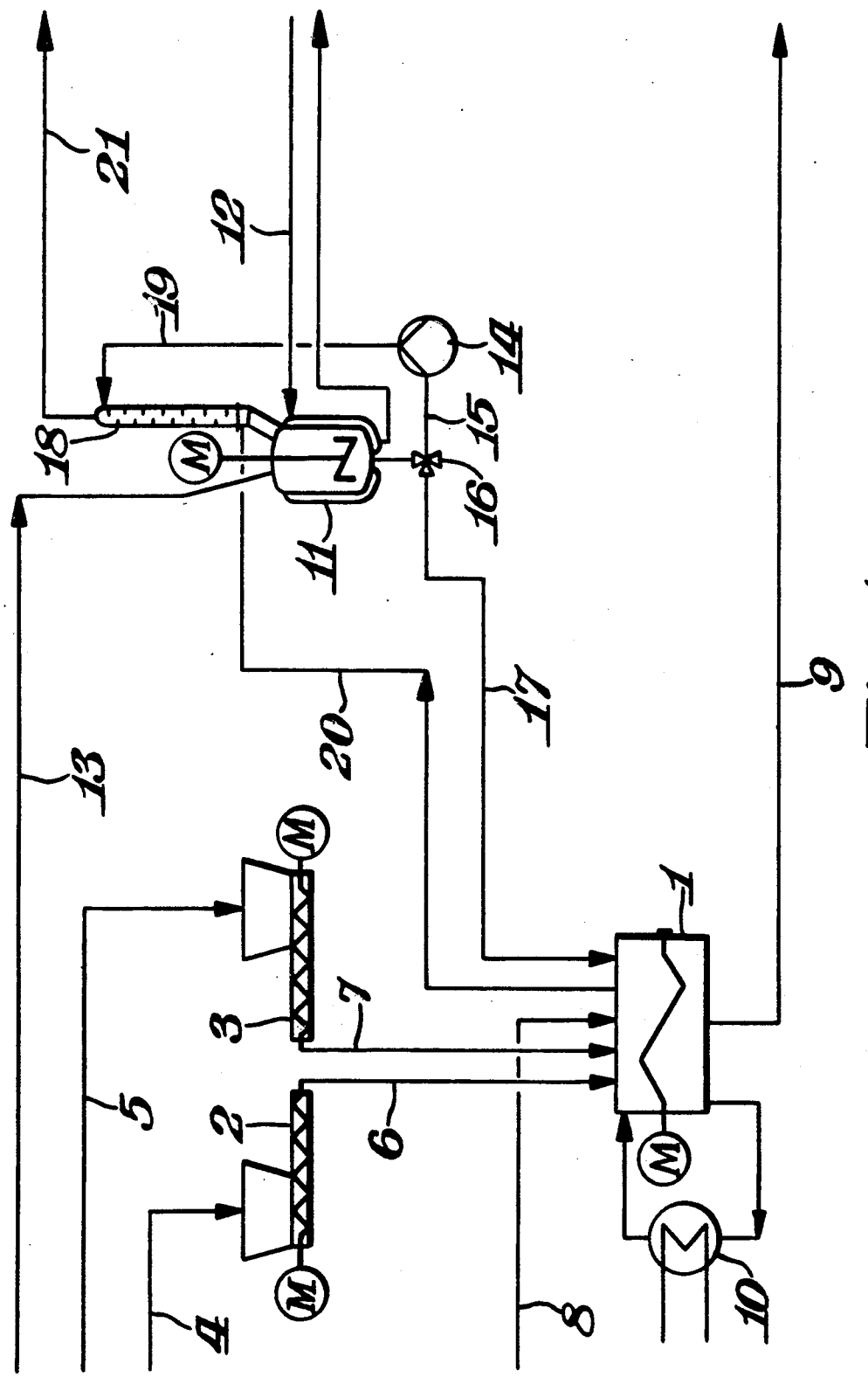
FIG. 1 shows a plant with absorption of the ammonia in a column.

A first metering device 2 for phosphorus pentoxide and a second metering device 3 for diammonium phosphate are arranged above a reactor 1. Feed tubes (4, 5) run into the metering devices (2, 3) and tubes (6, 7) run from the metering devices into the reactor 1. In addition, an ammonia feed tube 8 runs into the reactor 1, while an ammonium polyphosphate discharge tube 9 leaves the base of the reactor 1. The reactor 1 is furthermore connected flow-wise to a hot-oil generator 10.

A feed line 13 for polyphosphoric acid runs into a twin-walled stirred tank 11, which can be heated via a steam-feed tube 12, while a line 15 runs from the base of the stirred tank 11 to a pump 14. The line 15 contains a three-way valve 16, through which the reactor 1 can be charged with partially ammoniated polyphosphoric acid via an outlet line 17.

In accordance with FIG. 1, a column 18 is mounted on the stirred tank 11 and can be charged at the top with partially ammoniated polyphosphoric acid via a line 19 which is connected to the pump 14, while the foot of the column 18 is connected to the reactor 1 via a line 20 for the supply of ammonia- and water vapor-containing offgas. In addition, an offgas line 21 leaves the top of the column 18.

Figure 2:
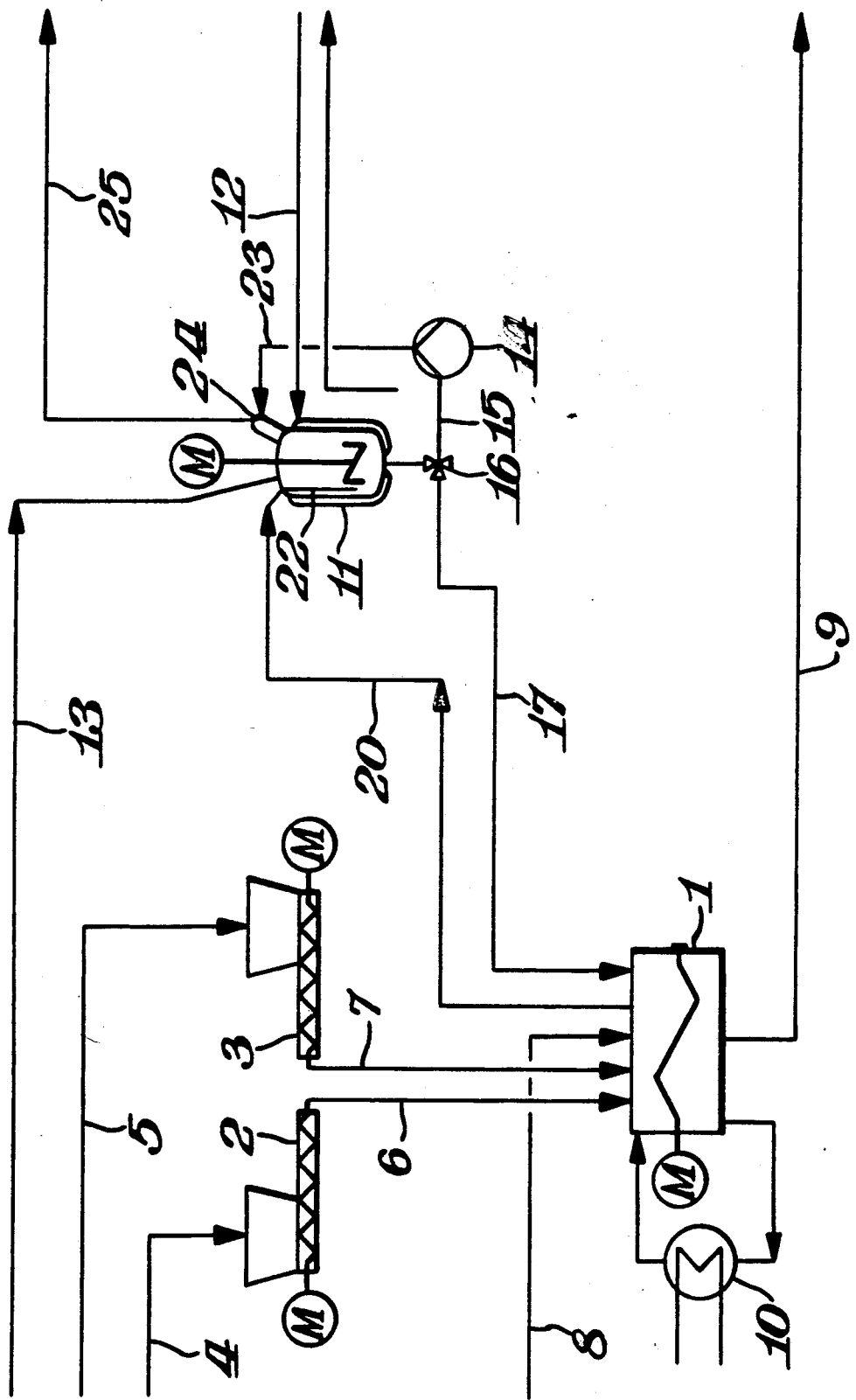
FIG. 2 shows a plant with absorption of the ammonia in a tank.

In accordance with FIG. 2, the line 20 for ammonia- and water vapor-containing offgas terminates in an immersion tube 22 arranged in the stirred tank 11. A line 23 runs from the pump 14 into a connector 24 on the stirred tank 11. In addition, an offgas line 25 runs from the connector 24.

EXAMPLE 1

Figure 3:
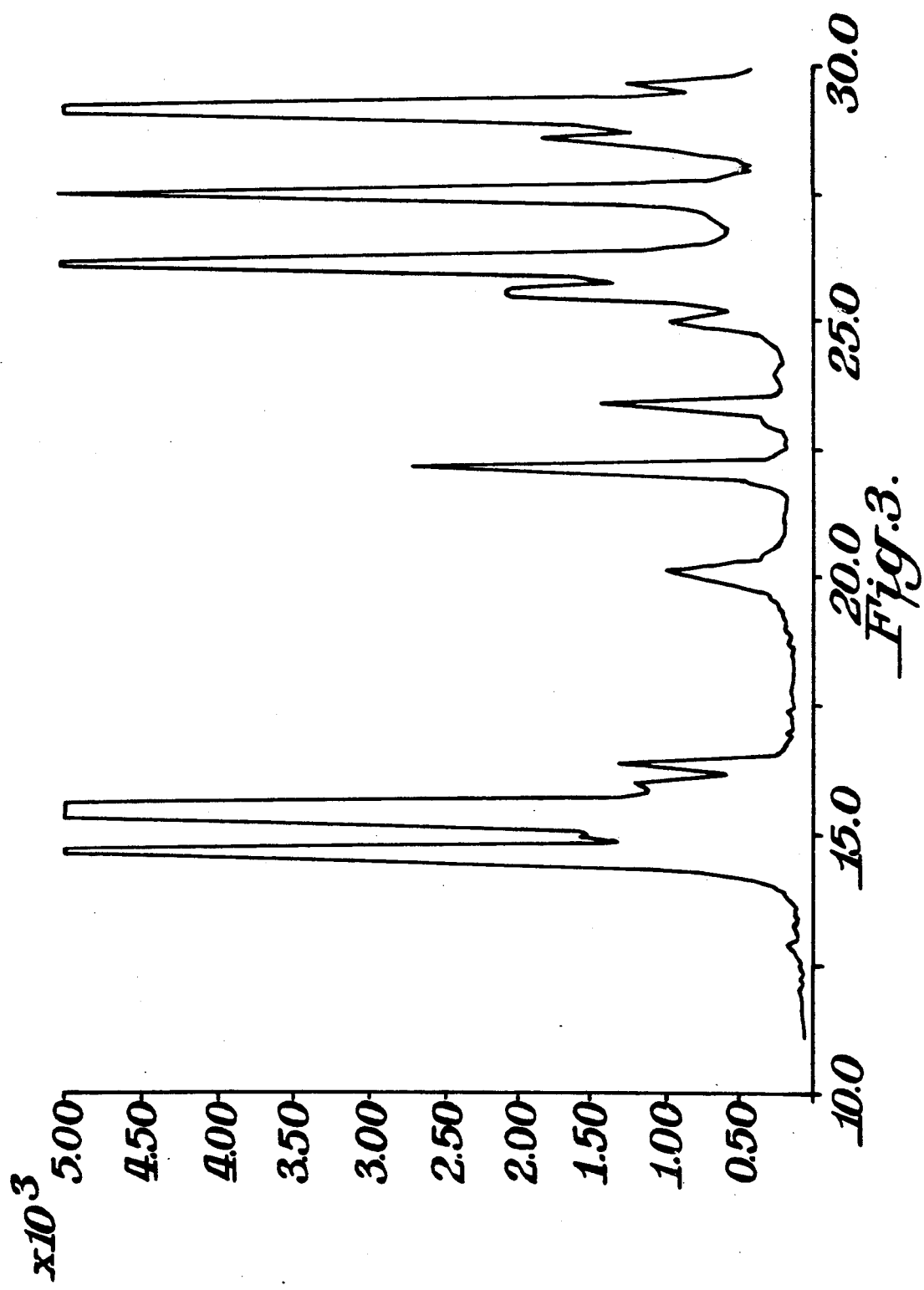

A mixture of 2.84 kg of phosphorus pentoxide and 2.64 kg of diammonium phosphate was melted at 200° C. in a reactor (twin-walled Z kneader with a capacity of 10 l). The melt was heated to 280° C. while ammonia was passed into the reactor, and the contents were kept at this temperature for 30 minutes. 1.4 kg of partially ammoniated polyphosphoric acid (84% by weight of $P_2O_5$) at 170° C. were then added. After a total reaction time of 4 hours, an ammonium polyphosphate having the following properties was obtained:

pH 6.8
Acid number 0.2 mg of KOH/g
Viscosity 32 mPa.s
Soluble content 7.2%
Chain length > 1000
Modification II (according to an X-ray diagram; cf. FIG. 3)

EXAMPLE 2

Figure 4:
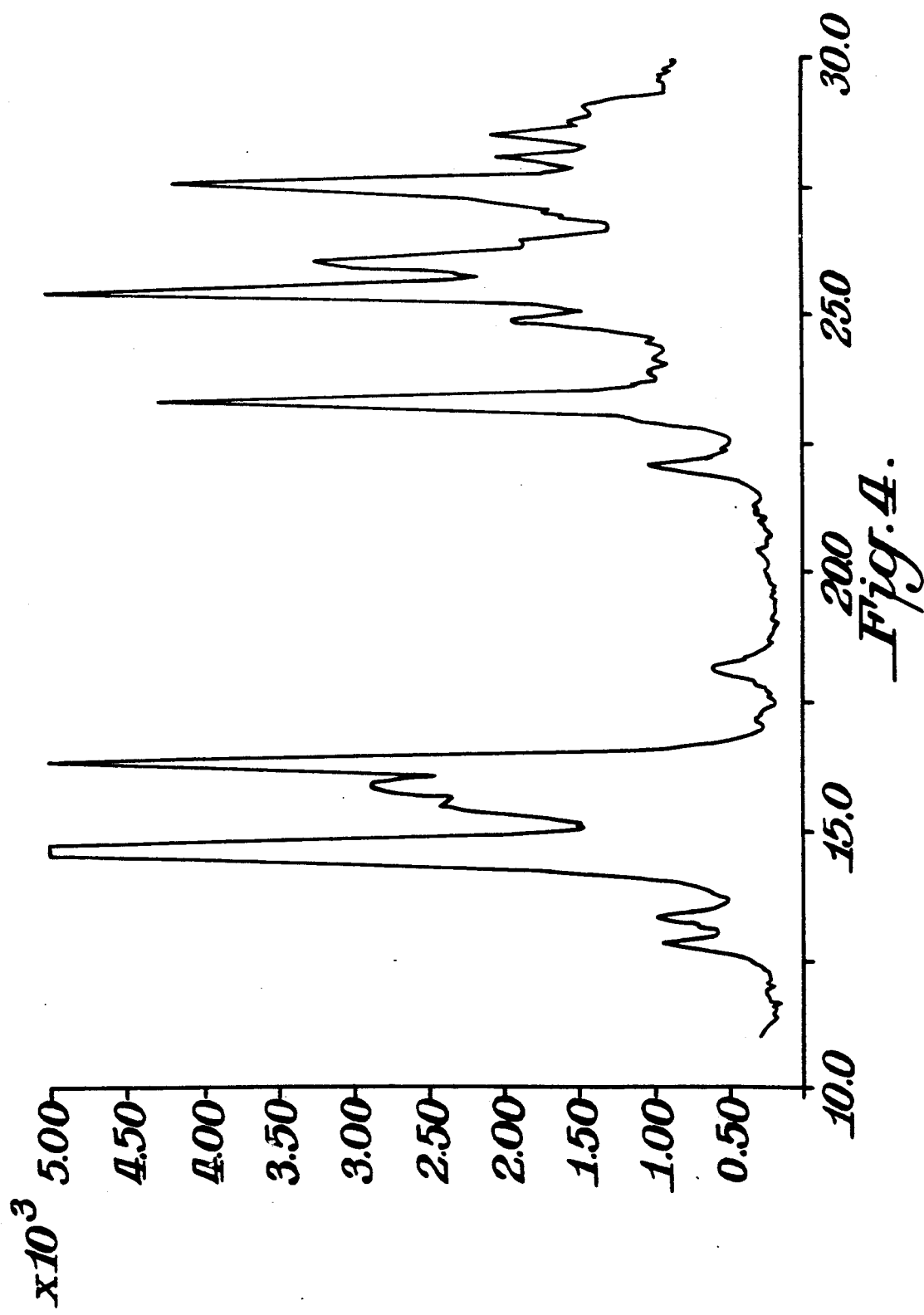

4.8 kg of ammonium polyphosphate of modification I were introduced into a reactor (twin-walled Z kneader with a capacity of 10 l) pre-heated to 150° C. 2.9 kg of partially ammoniated polyphosphoric acid (84% by weight of $P_2O_5$) at 160° C. were then introduced. After reaction for 3.5 hours at 280° C. under an ammonia atmosphere, a pulverulent ammonium polyphosphate having the following properties was obtained:

pH 6.6
Acid number 0.64 mg of KOH/g
Viscosity 22 mPa.s
Soluble content 6.0%
Chain length 45
Modification I (according to an X-ray diagram; cf. FIG. 4)

FIGS. 3 and 4 show the intensities plotted on the ordinate and the diffraction angles $2\theta$ plotted on the abscissa.

We claim:

1. A process for the preparation of essentially water-insoluble linear ammonium polyphosphate from equimolar amounts of diammonium phosphate and phosphorus pentoxide in the presence of ammonia at temperatures of from 170° to 350° C. while continuously mixing, kneading and comminuting the reaction material, which comprises replacing at least some of the diammonium phosphate and phosphorus pentoxide by partially ammoniated polyphosphoric acid, said partially ammoniated polyphosphoric acid having been obtained by bringing polyphosphoric acid into contact with water vapor- and ammonia-containing gasses.

2. The process as claimed in claim 1, wherein up to 15% by weight of the diammonium phosphate and of the phosphorus pentoxide are replaced by partially ammoniated polyphosphoric acid.

3. The process as claimed in claim 1, wherein the water vapor- and ammonia-containing gases are off-gases from the preparation of essentially water-insoluble ammonium polyphosphate by reacting diammonium phosphate and phosphorus pentoxide in the presence of ammonia.

4. The process as claimed in claim 1, wherein the polyphosphoric acid is brought into contact with the water vapor- and ammonia-containing gases at a temperature between 120° and 170° C.

5. The process as claimed in claim 1, wherein the water vapor- and ammonium-containing gases are brought into contact with concentrated polyphosphoric acid.

6. The process as claimed in claim 5, wherein the polyphosphoric acid has a $P_2O_5$ content of from 70 to 88% by weight.

7. The process as claimed in claim 6, wherein the polyphosphoric acid has a $P_2O_5$ content of from 76 to 84% by weight.

* * * * *